United States Patent
Schmitt

(10) Patent No.: US 6,863,567 B2
(45) Date of Patent: Mar. 8, 2005

(54) ELECTRICAL WIRING WITH STRAIN RELIEF

(76) Inventor: Fred R. Schmitt, Huhnerbrunnele 13, Talheim (DE), D-74388

( * ) Notice: Subject to any disclaimer, the term of this patent is extended or adjusted under 35 U.S.C. 154(b) by 120 days.

(21) Appl. No.: 10/266,444

(22) Filed: Oct. 8, 2002

(65) Prior Publication Data

US 2003/0073340 A1 Apr. 17, 2003

(30) Foreign Application Priority Data

Oct. 12, 2001 (DE) .................................. 201 16 682 U
Oct. 12, 2001 (DE) .................................. 201 16 680 U
Aug. 24, 2002 (EP) .............................. 02018875

(51) Int. Cl.[7] .............................................. H01R 13/40
(52) U.S. Cl. .................................. 439/589; 174/153 R
(58) Field of Search ........................................ 439/551

(56) References Cited

U.S. PATENT DOCUMENTS 3,281,756 A * 10/1966 O'Keefe et al. ............ 439/320
3,546,658 A * 12/1970 Horssen et al. ............. 439/318
3,816,641 A *  6/1974 Iversen ........................ 174/76
3,850,495 A * 11/1974 Glover ........................ 439/273
4,355,855 A * 10/1982 Rebikoff .................... 439/275
4,869,679 A *  9/1989 Szegda ....................... 439/272
4,921,449 A *  5/1990 Fish ........................... 439/610
6,095,871 A *  8/2000 Zahora et al. .............. 439/695

* cited by examiner

Primary Examiner—Hae Moon Hyeon
(74) Attorney, Agent, or Firm—Darby & Darby

(57) ABSTRACT

Electrical wiring having an electrical cable with strain relief, wherein the cable is attached either to the housing wall which bounds a circular cylindrical housing opening in a housing which holds electrical devices, or to a round plug connector which has a circular cylindrical cross section, in each case by means of strain relief. A hollow cylindrical molding can be fitted to the tubular connecting stub in the axial direction. This molding can be pressed against the tubular connecting stub by the union nut in the axial direction. A hollow cylindrical connecting stub is provided on the molding such that it protects in the axial direction, and can be placed against the cable sheath from the inside of the cable. A sleeve can be firmly pressed against the cable in the cross-sectional area of the projecting connecting stub, so that the cable sheath can be held by pinching it.

16 Claims, 2 Drawing Sheets

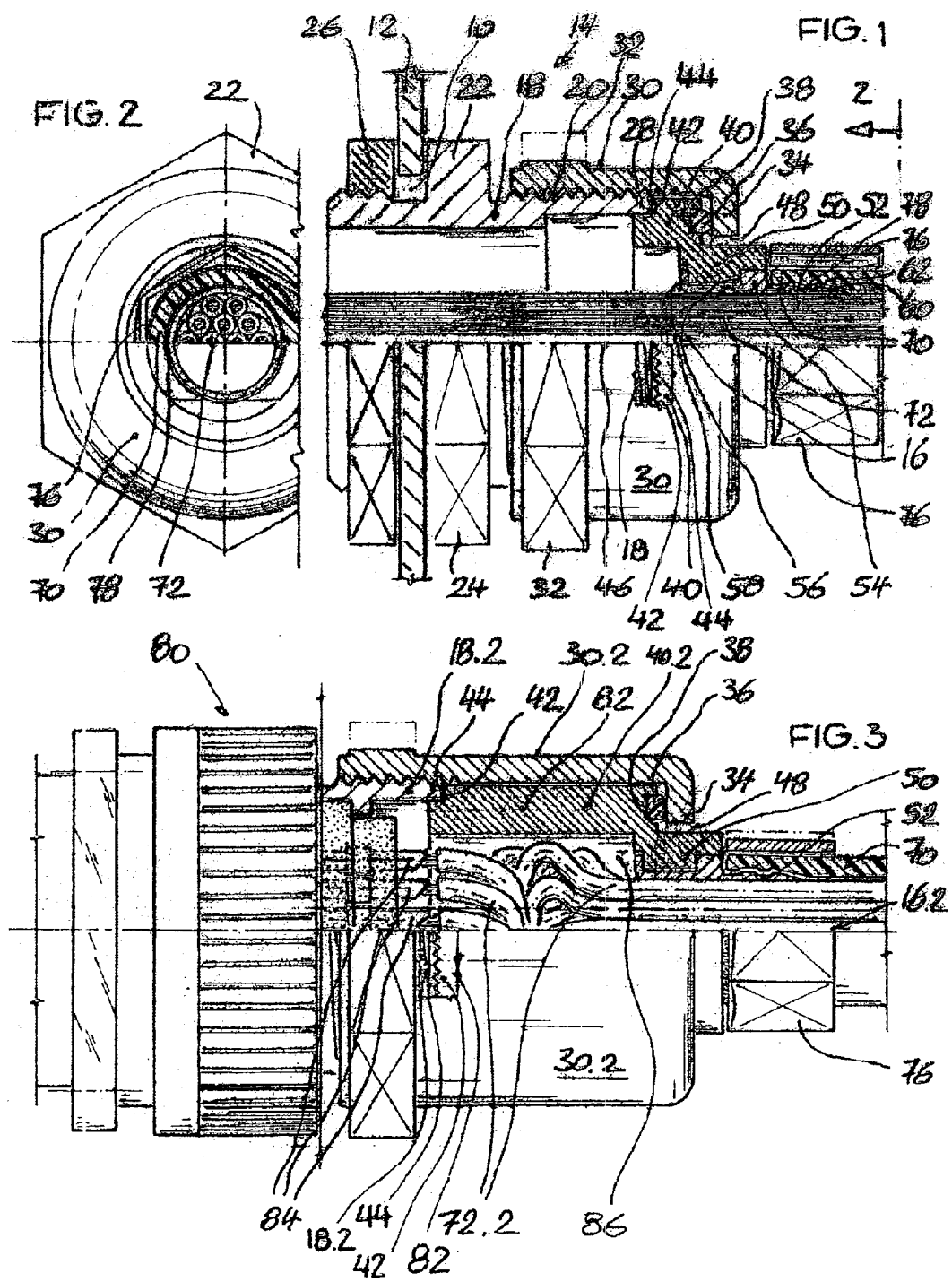

ELECTRICAL WIRING WITH STRAIN RELIEF

TECHNICAL FIELD

The invention relates to wiring which is equipped with strain relief. The strain relief is intended to prevent tensile forces which act in the axial direction from the outside on the cable sheath of an electrical cable moving said cable sheath relative to the cable cores in the interior of the cable. This is because, otherwise, it would be possible for the mechanically firm seating of the cores in their respective contact-making point in the interior of the housing to be lost.

PRIOR ART

Electrical housings which are fitted with electrical components have so-called cable bushings, by means of which electrical cables are passed through the housing wall into or out of the relevant housing. The cable bushing, which is in each case provided for one cable, has a tubular connecting stub. A flange part is integrally formed on the outside of the tubular connecting stub. This flange part and a nut which can be screwed to the tubular connecting stub allow the tubular connecting stub to be firmly clamped at one of its ends to the edge area of the housing wall which bounds the through-opening for the cable. A union nut is screwed to the other end of the tubular connecting stub, which project out of the housing. A tubular sealing element is placed in the interior of the tubular connecting stub. One end face of this sealing element is seated on a circumferential, inward-projecting shoulder in the tubular connecting stub. The union nut presses against the other end face of the sealing element, in the axial direction. Screwing the union nut onto the tubular connecting stub compresses the sealing element in the axial direction, so that the sealing element expands in a corresponding manner inward in the radial direction. The sealing element can thus be pressed from the outside against the sheath of the cable which is passed through the tubular connecting stub. The cable can thus be pinched together, and in consequence, can be held in the region of the housing opening such that is resistant to tension in the axial direction.

In order to prevent the sealing element from also rotating in a corresponding manner when the union nut is tightened, which would result in the cable sheath also being rotated in a corresponding manner, the end surface of the tubular connecting stub may be designed to be toothed. When the sealing element is crushed, a shoulder of the sealing element then presses against the toothed annular surface, thus preventing rotational movement about the cable axis.

In the case of a cable which is provided with a cable shield, it is also known for the corresponding shielding mesh to be pressed axially against end wall areas of the cable screw union by means of the sealing element. This does not result in the cable shield being held such that it can resist tension.

Round plug connectors which are known from the prior art also have strain relief which acts in a comparable manner on the cable bushing. Round plug connectors likewise have a tubular connecting stub which, like the cable bushing, is provided at one of its ends with a toothed annular surface. A union nut is likewise screwed over this end of the tubular connecting stub with the toothed annular surface. Two cleat halves are integrally formed at the ends on the union nut and are provided with inward bulges pointing toward one another. The two cleat parts rest from the outside against the sheath of an electrical cable passing through. By screwing the two cleat parts to one another, the sheath can be held such that it is pinched between them. The union nut in these round plug connectors has an axial length which is considerably greater than that of the cable bushing in order to allow connection, such as soldering, of the electrical contact elements in the cable to the mating contact elements, which end in the region of the toothed annular surface of the tubular connecting stub, without any problems. The toothed annular surface on the tubular connecting stub digs into a circumferential shoulder internally in the union nut in the axial direction when the two are screwed together. This is intended to prevent the union nut from being inadvertently released from the tubular connecting stub.

Both wiring devices have strain relief which has a more "powerful" effect the more strongly the cable is pinched. The effect of the strain relief thus depends on the extent to which the cable is compressed. However, if the cable is compressed to a correspondingly great extent, this also affects the cable cores or cable elements in the interior of the cable, which is undesirable electrically. There is therefore a conflict of aims between the effectiveness of the strain relief and the electrical functionality of the relevant cable connection.

DESCRIPTION OF THE INVENTION

Against the background of this already known prior art, the invention is based on the object of specifying effective strain relief for electrical wiring. This invention is specified by the features in the main claim. Developments of the invention are the subject matter of further claims which are subsidiary to this claim.

The invention is based on the knowledge that electrical wiring of the type mentioned initially always has a specific tubular connecting stub/union nut constellation which is (also) intended to allow strain relief. The invention includes the possibility of a molding with a hollow cylindrical connecting stub projecting in the axial direction being inserted between the respectively provided tubular connecting stub and its union nut, which can be screwed to it. The hollow cylindrical connecting stub is seated pushed in between the cable sheath and the cable cores. A sleeve which is pushed onto the cable from the outside pinches the cable sheath between it and the hollow cylindrical connecting stub. The pinching forces, which include the strain relief for the relevant electrical cable, do not act transversely all the way through the cable, but act only on the sheath. Since the hollow cylindrical connecting stub which is seated in the cable cannot be deformed, the electrical cores, electrical pin elements or other electrical contact elements in the interior of the cable are not subjected to the pinching force loads.

If the insert parts provided according to the invention as above, such as the molding with its hollow cylindrical connecting stub, are produced from metallic material, and the tubular connecting stub of the cable bushing or the tubular connecting stub of the round plug connector are likewise produced from metallic material, this provides optimum RF (Radio Frequency) shielding. In the case of the cable bushings which are known from the prior art, this is not provided by the existing plastic sealing element. In the case of round plug connectors, there are normally axial air gaps in the cable cleats at the ends of the nut, and these do not allow complete RF shielding.

The molding which is in each case provided according to the invention can be integrally connected to the connecting stub which is fitted such that it projects on it. However, it is also possible to attach the projecting connecting stub to the molding, in particular with it being riveted to it.

In order to arrange the molding such that it cannot be twisted, its annular surface, by means of which it is seated on the tubular connecting stub, may, for example, be designed such that it is toothed.

The molding may be annular or else approximately in the form of a disk, especially when it is used in conjunction with cable bushings. When it is used in conjunction with round plug connectors, the molding will generally have a relatively long axial length. This can be achieved by providing a piece of tubing between the annular body and the tubular connecting stub. This piece of tubing may be provided integrally on the molding. The piece of tubing, or the molding with the piece of tubing, may also then likewise provide the twisting protection, for example like the toothed annular surface already mentioned above.

In order to allow electrical wiring of the type according to the invention with angled cable guides, for example in particular cable guides angled at 90° (degrees), the hollow cylindrical molding may have an angled shape. Its longitudinal axis then has a bend or kink, corresponding to the size of the cable angle.

Further refinements and advantages of the invention can be found in the features which are also listed in the claims as well as in the following exemplary embodiments.

BRIEF DESCRIPTION OF THE DRAWING

The invention will be explained and described in more detail in the following text with reference to the exemplary embodiments which are illustrated in the drawing, in which:

FIG. 1 shows a partially sectioned side view of wiring with a cable bushing,

FIG. 2 shows a partial view along the arrow 2 in FIG. 1,

FIG. 3 shows a partially sectioned side view of wiring with a round plug connector.

APPROACHES TO IMPLEMENTATION OF THE INVENTION

Figure 4:
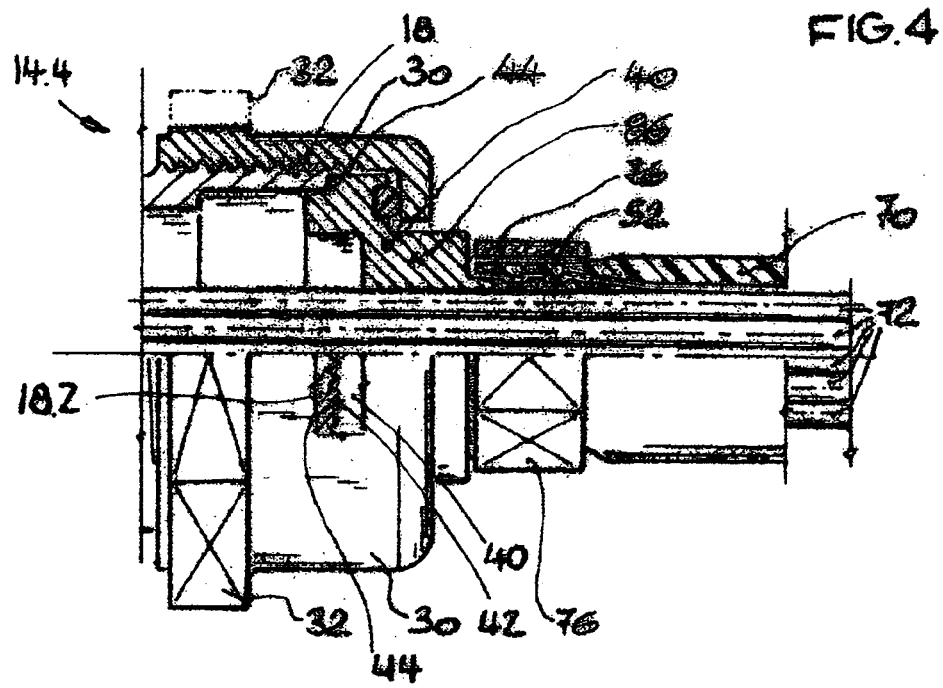
FIG. 4 shows a partial view of a detail of a hollow cylindrical molding with an integrally formed hollow cylindrical connecting stub, as part of further wiring according to the invention.

A cable bushing 14 for an electrical cable 16 is installed in a circular opening 10 in a housing wall 12 of an electrical housing (FIGS. 1, 2).

The cable bushing 14 has a tubular connecting stub 18 which projects through the opening 10 and is provided with an external thread 20. A flange part 22 with a hexagonal shape 24 is integrally formed on the tubular connecting stub 18 such that it projects outward. The edge area of the housing wall 12, bounding the opening 10, is held such that it is clamped in between this flange part 22 and a nut 26 which is screwed onto the end of the tubular connecting stub 18. The tubular connecting stub 18 is in this way firmly attached to the housing wall 12.

A union nut 30 is screwed to the right-hand end 28 of the tubular connecting stub 18 in FIG. 1. The union nut 30 has a hexagonal shape 32 at its left-hand end. This allows the tubular connecting stub 18 and the nut 26, as well as the union nut 30, to be screwed together using standard wrenches.

An annular cover area 34, which is integrally formed at the end of the union nut 30, presses in the axial direction against a sealing ring 36, which is seated in an annular groove 38 in a hollow cylindrical molding 40. The molding 40 is in the form of an annular body. The left-hand, radially outer edge region of the molding 40, as shown in FIG. 1, which edge region is in the form of a toothed annular surface 42, rests on the end surface 44 of the tubular connecting stub 18, which is likewise toothed. The toothed annular surface 42 of the molding 40 and the toothed end surface 44 of the tubular connecting stub 18 are thus wedged to one another, thus preventing them from twisting with respect to one another about the longitudinal axis (axis of symmetry) 46.

The molding 40 has an annular part 50 which projects through the central opening 48 in the cover area 34 of the union nut 30.

A hollow cylindrical connecting stub 52 is riveted to the inside of this annular part 50. This hollow cylindrical connecting stub 52 has an approximately central radial thickened region 54, which rests against a shoulder 56 on the annular part 50. The edge 58 of the connecting stub 52 which is on the left in FIG. 1 is flanged outward and rests like a rivet on the left-hand end of this annular part 50. The annular part 50 is thus clamped in between the thickened region 54 and the bent edge 58 of the connecting stub 52. The hollow cylindrical connecting stub 52 is thus firmly seated on the hollow cylindrical molding 40.

The right-hand end of the hollow cylindrical connecting stub 52 in FIG. 1 has an angular tip 60 and circumferential ribs 62. The tip 60 is used to push the hollow cylindrical connecting stub 52 between the sheath 70 and the cores 72 of the cable 16, before the corresponding cable 16 is passed through the cable bushing 14. The sheath 70 thus ends in front of the annular part 50, and is not pushed through the cable bushing 14.

A sleeve 76 is pushed over the sheath 70 from the outside. The sleeve 76 is pinched onto the sheath 70, using a technique which is known per se. The hollow cylindrical connecting stub 52 is designed to be sufficiently resistant to bending, so that the pinching forces which are exerted on the cable 16 during deformation of the sleeve 76 are absorbed by the hollow cylindrical connecting stub 52. The cores 72 in the interior of the hollow cylindrical connecting stub 52 are in consequence not influenced by transverse forces. In consequence, the cable 16 is held by pinching forces which act only on its sheath 70—but not also on its cores 72. This therefore results in strain relief, which does not place any load on the cores 72, for the cable 16 in the cable bushing 14.

With this strain relief, the hollow cylindrical connecting stub 52 is pushed not only under the sheath 70 but also under an electrically conductive shielding mesh 78, which surrounds the cores 72 on the outside. This shielding mesh is cut off at the free end surface of the sheath 70. The cores 72 are thus surrounded on all sides by electrically conductive material in the region of the cable bushing, since the hollow cylindrical connecting stub 52 and the molding 40 and, furthermore, also the tubular connecting stub 18 are composed of electrically conductive material. Thus, in addition to optimum strain relief, this also ensures highly effective RF (Radio-Frequency) shielding in the cable bushing 14.

Like the cable bushing 14, the round plug connector 80 illustrated in FIG. 3 has a tubular connecting stub 18.2 which is provided with a toothed end surface 44. A union nut 30.2 is screwed onto the tubular connecting stub 18.2 from the outside, and its cover area 34 once again rests against a sealing ring 36, pressing against it in the axial direction. The sealing ring 36 is seated in an annular groove 38 which is formed at the end in a hollow cylindrical molding 40.2. The molding 40.2 corresponds to the molding 40, with the only major difference being that a piece of tubing 82 is integrally formed on its left-hand end region in FIG. 3. This piece of tubing 82 gives the molding 40.2 an axial length which is greater than that of the molding 40. The toothed annular surface 42 is once again provided at the left-hand end of the piece of tubing 82, and hence of the molding 40.2, in FIG. 3, by means of which the molding 40.2 is seated on the toothed end surface 44 of the tubular connecting stub 18.2—forming a wedge between them.

Pin contacts 84 of the round plug connector 80 end within the tubular connecting stub 18.2. The ends of the cores 72.2 of the cable 16.2 are soldered to these pin contacts 84. Instead of soldered joints, it would also be possible to use other known contact connections between the cores 72.2 and the contacts 84.

The strain relief is provided in the same way as in the cable bushing 14 (FIG. 1). The sheath 70 of the cable 16.2 is held pinched in between the hollow cylindrical connecting stub 52 and the sleeve 76. Axial vibration-resistant retention is achieved by the hollow cylindrical connecting stub 52 also being fitted to the molding 40.2 in the same way as that already described above for the molding 40.

The axially relatively long piece of tubing 82 allows the strain relief to be provided on the cable 16.2 first of all when this electrical wiring is being installed on the round plug connector 80, with the ends of the cores 72.2 projecting for a sufficient length in the axial direction from the area of the piece of tubing 82 which has not yet been fitted to the round plug connector 80, in order to allow the cores 72.2 to be soldered to the contacts 84 safely. When the molding 40.2 is fitted to the tubular connecting stub 18.2 by means of the union nut 30.2, there is a cavity 86 within the area of the piece of tubing 82 in which the cores 72.2 can bend so that their length which is no longer required can be accommodated in the area of the wiring when the wiring is in the assembled state.

The cable bushing 14.4, a detail of which is illustrated in FIG. 4, corresponds to the cable bushing 14 shown in FIG. 1, except for its hollow cylindrical part 86. This hollow cylindrical part 86 corresponds to the hollow cylindrical molding 40 and to the hollow cylindrical connecting stub 52 of the cable bushing 14 as illustrated in FIGS. 1 and 2. The molding 40 and the connecting stub 52 are integrally connected to one another in this hollow cylindrical part 86. A corresponding integral embodiment is also possible for the molding 40.2 and connecting stub 52, as illustrated in FIG. 3, in the same way.

Figure 5:
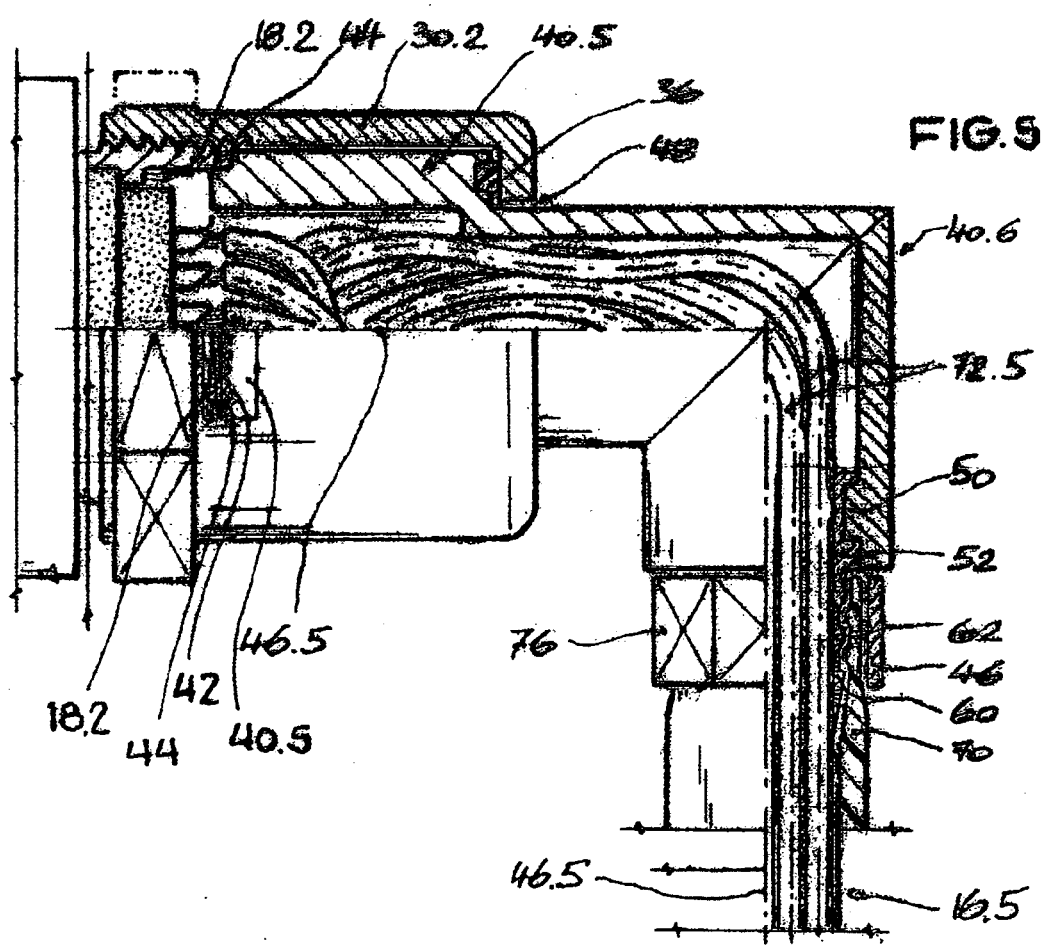
FIG. 5 shows an end, partially sectioned, side view of further wiring, similar to that in FIG. 1 or FIG. 2, with an angled cable entry.

FIG. 5 shows a detail of the outer, right-hand end region of wiring for a round plug connector, in which a cable 16.5 is inserted at an angle of 90° (degrees) into the round plug connector—illustrated in FIG. 3, but not in FIG. 5—, where it is connected.

The wiring illustrated in FIG. 5 has an angled molding 40.5, which is provided in the interior of the union nut 30.2 and corresponds to the molding 40.2 in FIG. 3. Thus, in FIG. 5 as well, the molding 40.5 is pressed against the tubular connecting stub 18.2 in the axial direction via an intermediate sealing ring 36, as is also the case with the round plug connector 80 illustrated in FIG. 3.

Outside the central opening 48 in the union nut 30.2, the molding 40.5 has an angled shape 40.6. In the present case, the size of the angle is 90° (degrees). An annular part 50, which projects inward and represents a thickened region, is integrally formed on the projecting end of this angled shape 40.6, in the same way as on the molding 40.2. This annular part 50 is surrounded on the inside by the connecting stub 52, as is likewise the case with the hollow cylindrical moldings 40 and 40.2

The tip 60 (which is provided with ribs 62) of the hollow cylindrical connecting stub 52 is pushed in under the cable sheath 70 of the cable 16.5, as in the previous embodiments. The end region of this cable sheath 70 is held pinched in between the tip 60 with the ribs 62 and a sleeve 76 which is crimped off from the outside, in the same way as already described in the previous embodiments.

In the region of the angled shape 40.6, the cores 72.5 of the cable 16.5 are inserted in a curved manner into the area of the union nut 30.2. The angled shape 40.6 results in the longitudinal axis 46.5 being guided longitudinally with a bend through 90° (degrees) in the present example.

The major difference between the molding 40.5 and the molding 40.2 is, accordingly, that the area with the annular part 50 which projects inward is "shifted" to the end of the area of the angled shape 40.6. Thus, even with the angled cable guidance, the design which is intended for attachment of the cable to the wiring can remain unchanged in that, as before, the cable sheath is held pinched in between a sleeve 76 and a hollow cylindrical connecting stub 52.

In the same way as in FIG. 4, in the wiring shown in FIG. 5, the hollow cylindrical connecting stub 52 may also be integrally formed on the annular part 50, and may hence be integrally connected to the molding 40.5.

Instead of 90° (degrees) cable guidance, guidance through any other desired angles may also be provided. Appropriately angled moldings 40.5 just need to be provided for this purpose. The other structural parts of the wiring can then remain unchanged.

What is claimed is:

1. An electrical wiring, having at least one electrical cable, which can be attached either to a housing wall which bounds a circular cylindrical housing opening in a housing which holds electrical devices, or to a round plug connector which has a circular cylindrical cross section, in each case via a strain relief so that cores of the cable are isolated from tensile forces, having a holding apparatus which holds a cable sheath of the cable such that it is clamped therein, in which, with regard to the cable which can be passed through the housing opening, said cable can be guided in the interior of a tubular connecting stub, which can be inserted in the housing opening, onto the end of which tubular connecting stub a union nut can be screwed, leaving free a central opening for the cable, or in which, with regard to the cable which can be connected to a round plug connector, said cable ends in the interior of a tubular connecting stub, onto the end of which a union nut can likewise be screwed, leaving free a central opening for the cable, wherein a hollow cylindrical molding can be fitted to the tubular connecting stub in the axial direction, this molding can be pressed against the tubular connecting stub in the axial direction by the union nut, a hollow cylindrical connecting stub is provided on the molding, so that the tensile forces acting on the sheath are prevented from acting on the cores, a sleeve can be positioned on the cable in the cross-sectional area of the hollow cylindrical connecting stub and can be pressed firmly against the cable, so that the holding apparatus can be simultaneously placed against the cable sheath from the inside of the cable and from the outside of the cable, clamping it.

2. The wiring as claimed in claim 1, wherein the tubular connecting stub, the union nut, the molding and the hollow cylindrical connecting stub are composed of metallic material.

3. The wiring as claimed in claim 1, wherein the molding is integrally connected to the projecting connecting stub.

4. The wiring as claimed in claim 1, wherein the hollow cylindrical connecting stub is attached to the molding.

5. The wiring as claimed in claim 1, wherein twisting protection is provided on the molding such that, when the molding is seated on the tubular connecting stub, it is possible to prevent relative twisting of the molding with respect to the tubular connecting stub.

6. The wiring as claimed in claim 5, wherein the molding is in the form of an annular body, the molding has a toothed annular surface which forms the twisting protection and by which it can be placed against the tubular connecting stub.

7. The wiring as claimed in claim 1, wherein a piece of tubing is provided in the axial direction between the molding and the tubular connecting stub, the piece of tubing has a toothed annular surface, by which it can be placed against the tubular connecting stub.

8. The wiring as claimed in claim 7, wherein the piece of tubing is integrally connected to the molding.

9. The wiring as claimed in claim 1, wherein a sealing ring is provided between the molding and the union nut.

10. The wiring as claimed in claim 1, wherein the hollow cylindrical molding has an angled shape, so that its longitudinal axis is angled.

11. The wiring as claimed in claim 10, wherein the molding has an angled end region, this angled region is provided outside the central opening of the union nut (30.2) which can be screwed to the molding, the hollow cylindrical connecting stub is provided at the free end of the angled end region.

12. The wiring as claimed in claim 11, wherein the hollow cylindrical connecting stub is attached to the annular part of the angled shape of the molding.

13. The wiring as claimed in claim 11, wherein the hollow cylindrical connecting stub is integrally connected to the annular part of the molding.

14. The wiring as claimed in claim 1, wherein the molding has a annular part, which part is mounted resistant to tension between an approximately central radially thickened region and the edge of the connecting stub, which is outwardly flanged.

15. The wiring as claimed in claim 12, wherein the hollow cylindrical connecting stub is riveted to the annular part of the angled shape of the molding.

16. The wiring as claimed in claim 4, wherein the hollow cylindrical connecting stub is riveted to the molding.

* * * * *